July 15, 1958     F. C. EGLEY     2,842,927
AUTOMOTIVE RIDEABLE MOWING MACHINE
Filed Feb. 27, 1956     3 Sheets-Sheet 3
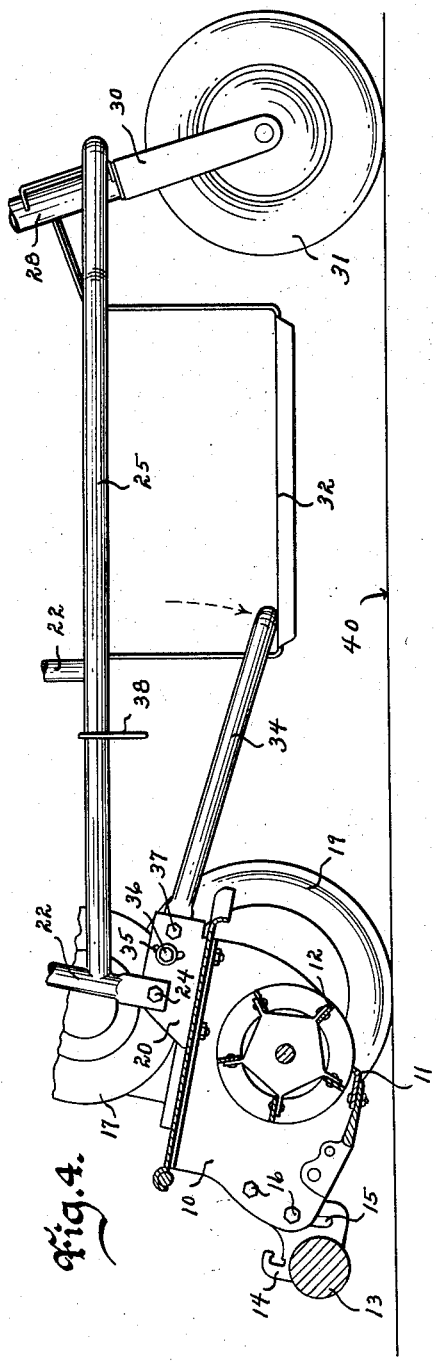
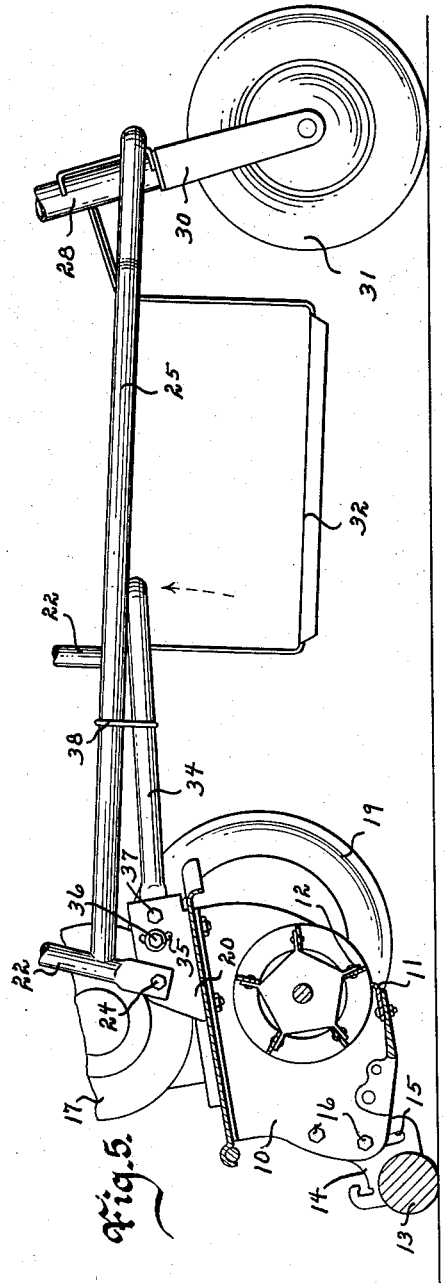
Inventor
FLOYD C. EGLEY
by M. Talbert Dick
Attorney
Witness
Edward P. Seeley

United States Patent Office 2,842,927
Patented July 15, 1958

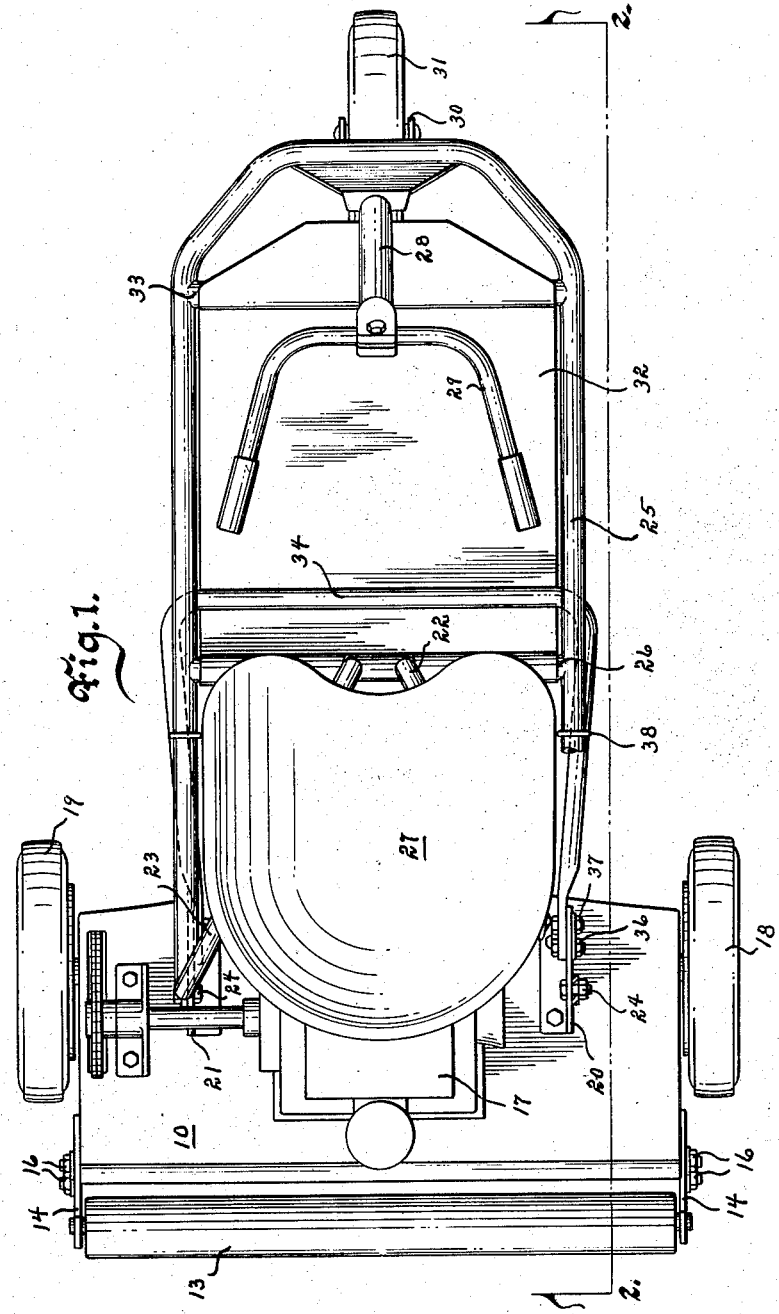

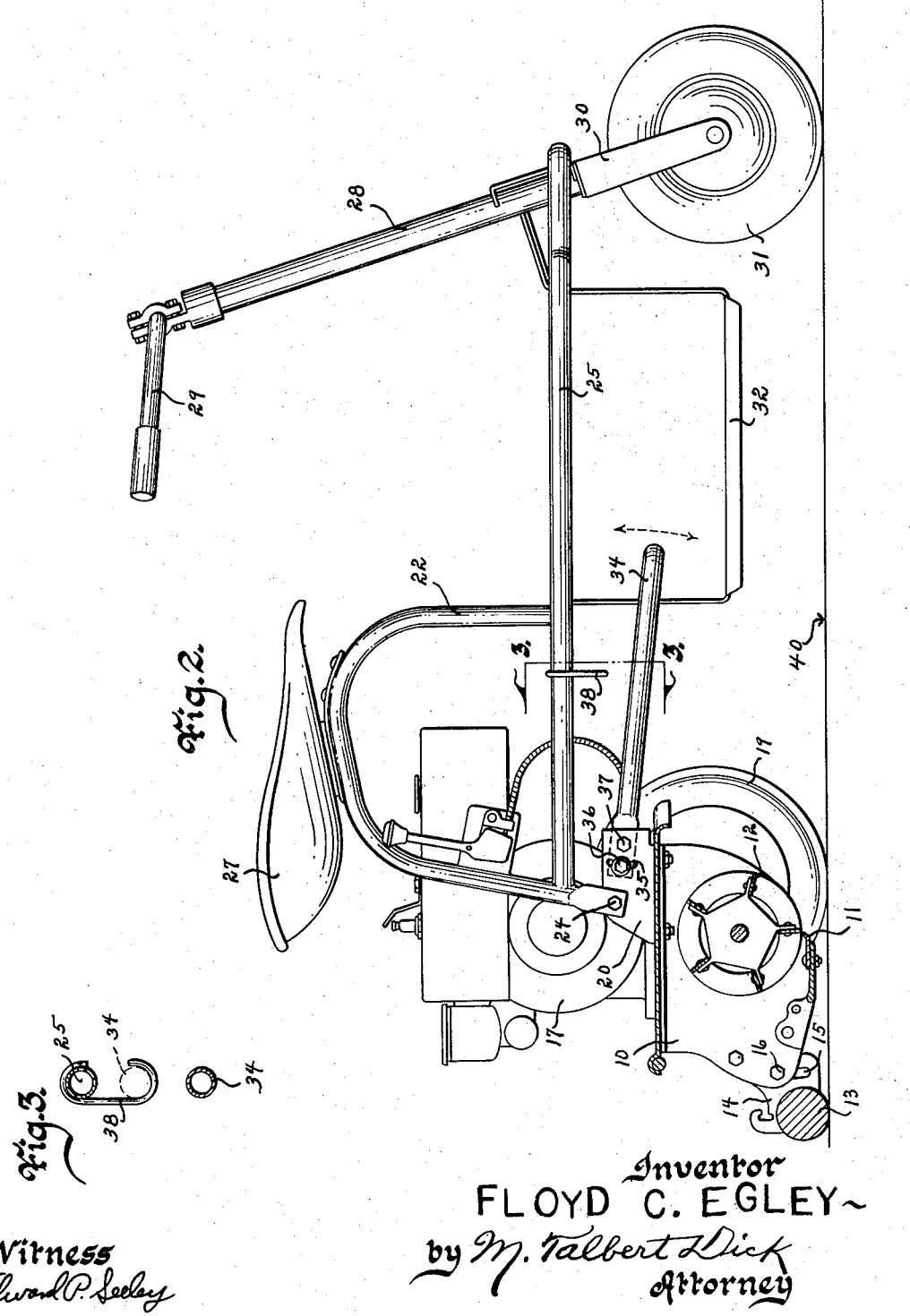

2,842,927

AUTOMOTIVE RIDEABLE MOWING MACHINE

Floyd C. Egley, Ankeny, Iowa, assignor to Western Tool and Stamping Co., Des Moines, Iowa Application February 27, 1956, Serial No. 567,800

7 Claims. (Cl. 56—26)

This invention relates to mowing machines and more particularly to a self-propelled rideable lawn mower.

Manually pushed lawn mowers are old. To reduce labor many such machines now have their cutting mechanism actuated by an electric motor or internal combustion engine. While such available power does facilitate lawn mowing, one still has to push the implement over the ground surface to be conditioned. Some effort has been made to utilize the power of the prime mover to also propel the vehicle and thus also permit the user to ride on the machine. However, several problems were encountered. First, the cutting mechanism could not be raised to clear obstructions, nor relieve the machine of volume cutting beyond its capacity. Secondly, the machine can not be easily pushed forwardly or backwardly with a dead engine. Thirdly, in cranking the engine, the machine moved forwardly because it was directly connected to the vehicle drive wheels. The movement and resistance encountered made the manual cranking of the combustion engine almost impossible.

Therefore one of the principal objects of my invention is to provide an automotive rideable lawn mowing machine that is capable of having its cutting unit raised by the one riding on the machine.

A further object of this invention is to provide a means for raising the motorized traction wheels of the mower above the ground surface so that the vehicle may be easily pushed or the engine started by manual cranking.

Further objects of my invention are to provide an automotive lawn mowing machine that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a top plan view of my machine with parts broken away,

Fig. 2 is a side view of the device in mowing position with parts broken away and shown in section taken along line 2—2 of Figure 1 to more fully illustrate its construction, Fig. 3 is a cross sectional view taken on line 3—3 of Fig. 2 and illustrates the catch means for holding the powered traction wheels of the device in an elevated condition, Fig. 4 is a fragmentary view of a portion of Figure 2 showing the arrangement of parts when the cutting unit is elevated, and Fig. 5 is a fragmentary view of a portion of Figure 2 with the powered traction wheels raised above the supporting surface.

The mower cutting unit is of substantially standard design having a frame 10, cutter bar 11, reel 12, and trailing roller 13. This roller 13 is rotatably mounted in bracket bearings 14, each having an arcular slot 15. Bolts 16 extend through each slot 15 and the unit's frame 10, thereby permitting the vertical adjustment of the roller relative to the frame. The numeral 17 designates an internal combustion engine mounted on the frame 10 and operatively connected to the reel and the two rotatably mounted traction wheels 18 and 19. The connection may be by gears, sprocket gears and chains, belts, and pulleys, or like. Usually the power is connected to the traction wheels and the traction wheels are in turn operatively connected to the reel. The numerals 20 and 21 designate the spaced apart bearing brackets on the top of the frame 10. The numerals 22 and 23 designate two inverted vertical U-shaped frame members. The rear ends of these two frame members are pivoted to the bearings 20 and 21, respectively, by bolt means 24. The numeral 25 designates a horizontal U-shaped member having its two ends fixed to the two rear ends of the vertical U-members 22 and 23, respectively, at points directly above their pivot points, as shown in Fig. 2. The numeral 26 designates a cross bar extending between the two legs of the horizontal U-frame member 25. The two vertical inverted U-members 22 and 23 extend forwardly and toward each other with this forward end closely adjacent and fixed to the central area of the cross bar 26. A seat 27 is secured onto the tops of the inverted U-frame members 22 and 23. The numeral 28 designates a tube shaft operatively rotatably secured to the forward end of the frame 25 and extending upwardly and rearwardly, as shown in Fig. 2. The numeral 29 designates a handle bar secured to the top of the member 28. The numeral 30 designates a wheel fork secured to the lower end of the tube shaft 28. The numeral 31 designates a wheel rotatably mounted in the fork 30. The numeral 32 designates a foot platform between the two side lengths of the horizontal U-frame 25 and secured at its rear to the cross bar 26 and its forward end to a cross bar 33 extending between the two legs of the U-frame 25. This platform has its horizontal portion dropped a substantial distance below the horizontal plane of the U-frame 25, as shown in Fig. 5. The numeral 34 designates a U-shaped operating bar lever positioned below the U-frame 25, having its center portion extending above the horizontal position of the platform 32 and its free ends extending rearwardly to positions adjacent the two bearings 20 and 21, respectively, as shown in Fig. 1.

In each of the bearings 20 and 21 is an arcular slot 35. A bolt 36 extends through each slot and an end of the lever bar 34. A bolt 37 rotatably extends through the free end portions of the bar 34 and the adjacent bearing having the slot 35, as shown in Fig. 4. The numeral 38 designates a double hook having one end hooked over a leg of the U-frame 25 and its other end capable of detachably hooking under one leg of the bar 34 for holding that member in an elevated position, as shown in Fig. 5.

The practical operation of my device is as follows:

The pivot points of the members 22 and 23 are in a plane in the rear of the plane of the axle of the wheels 18 and 19. Therefore, with the bar 34 unhooked from the hook 38, the wheels 18 and 19 and roller 13 will be in contact with the ground surface 40 as shown in Fig. 2. The cutting bar 11 will be in lowered position. The front wheel 31 will support the front end of the device. The height of the cutting bar position will be according to the adjustment of the brackets 14 to the frame 10. The operator rides the machine by sitting on the seat 27 with his feet on the platform 32 and his hands on the steering mechanism. With the engine running the traction wheels 18 and 19 will be propelling the vehicle and rotating the reel. In case an obstruction is encountered, too much vegetation for the cutting unit to digest, or if for any reason it is desired to raise the cutter bar, it is merely necessary for the operator to place a foot onto the bar 34, and push downwardly thereby elevating both the roller 13 and cutter bar 11, as shown in Fig. 4. The amount of distance these members are raised will depend on the adjustment of the bolts 36 in the slots 35. By releasing foot pressure on the bar 34, the roller and cutter bar will drop back down to normal positions. As herebefore indicated it is often necessary to raise the powered traction wheels 18 and 19 above the surface 40, when the vehicle is manually wheeled from place to place and also when cranking the internal combustion engine. To maintain the traction wheels in such elevated condition the bar 34 is manually raised and the member 38 hooked under it as shown in Fig. 5.

From the foregoing it will be appreciated that I have provided a highly desirable motorized rideable mowing machine and one that is under proper control of the riding operator.

Some changes may be made in the construction and arrangement of my automotive rideable mowing machine without departing from the real spirit and purpose of my invention, and it is my intention to cover by my claims, any modified forms of structure or use of mechanical equivalents which may be reasonably included within their scope.

I claim:

1. In combination, a vehicle frame, power means on said frame, a front wheel assembly on a forward portion of said frame, a mower unit on a rear portion of said frame, said mower unit comprising a mounting frame including trailing roller means, mowing means and traction wheel means, said power means being operatively connected to said mowing and traction wheel means, horizontal pivot means connecting said mounting frame to said vehicle frame on an axis of rotation above and between the axes of rotation of said roller and traction wheel means, and manually operated force transmitting means on said mounting frame for alternatively orienting said mower unit on the pivot means to support the load of the vehicle either on the roller means or traction wheel means and permitting both the roller and traction wheel means to simultaneously engage a support surface over which the vehicle frame moves.

2. The structure of claim 1 in which said front wheel assembly comprises a steerable wheel.

3. The structure of claim 1 in which said roller and traction wheel means include axes of rotation longitudinally spaced transversely beneath said pivot means, the axis of rotation of said traction wheel means being normally offset forwardly of the axis of rotation of said pivot means.

4. The structure of claim 3 in which said force transmitting means comprises a lever extending forwardly of said mounting frame.

5. The structure of claim 4 includnig latch means on the vehicle frame for detachably retaining said lever in an upwardly extending position relative to said vehicle frame to maintain only said roller means in engagement with a support surface.

6. The structure of claim 1 in which said roller means is adjustable relative to said cutter means for regulating the height of cut of said cutter means.

7. The structure of claim 1 including an operator's seat on said frame from which said force transmitting means may be operated.

References Cited in the file of this patent
UNITED STATES PATENTS

| | | |
|---|---|---|
| 1,512,439 | Worthington | Oct. 21, 1924 |
| 2,285,230 | Roberton | June 2, 1942 |
| 2,479,015 | McHugh | Aug. 16, 1949 |